United States Patent [19]
Hayami

[11] Patent Number: 5,563,375
[45] Date of Patent: Oct. 8, 1996

[54] INSULATED ELECTRIC WIRE FOR HIGH-VOLTAGE DIRECT CURRENT

[75] Inventor: Hiroshi Hayami, Osaka, Japan

[73] Assignee: Sumitomo Electric Industries, Ltd., Osaka, Japan

[21] Appl. No.: 26,788

[22] Filed: Mar. 5, 1993

[30] Foreign Application Priority Data

Mar. 6, 1992 [JP] Japan ................................ 4-082881

[51] Int. Cl.$^6$ ................................................ H01B 7/00
[52] U.S. Cl. ................................ 174/120 R; 174/121 A
[58] Field of Search ............................ 174/120 R, 26 R, 174/110 R, 110 SR, 110 E, 120 SR, 121 A

[56] References Cited

U.S. PATENT DOCUMENTS

| | | | |
|---|---|---|---|
| 3,453,373 | 7/1969 | Yamamoto et al. | 174/120 R X |
| 3,539,409 | 11/1970 | Stone | 174/120 R X |
| 4,402,887 | 9/1983 | Kuriyama et al. | 264/22 |
| 5,208,275 | 5/1993 | Chatterjee | 523/200 |
| 5,216,058 | 6/1993 | Visneski | 524/357 |

FOREIGN PATENT DOCUMENTS

| | | |
|---|---|---|
| 60-118731 | 6/1985 | Japan . |
| 63-094503 | 4/1988 | Japan . |
| 1060642 | 3/1989 | Japan . |
| 1311143 | 12/1989 | Japan . |
| 2274742 | 11/1990 | Japan . |

*Primary Examiner*—Laura Thomas
*Assistant Examiner*—Christopher Horgan
*Attorney, Agent, or Firm*—Sughrue, Mion, Zinn, Macpeak & Seas

[57] ABSTRACT

An insulated electric wire for high-voltage direct current comprising a conductor having thereon an insulation layer including a polyethylene resin composition, and a sheath layer provided on the outer periphery of the insulation layer. The sheath layer includes a flame retardant resin composition including a polyvinylchloride grafted polyolefin resin. The flame retardant resin composition contains either (i) a lead compound stabilizer and a hydrotalcite or (ii) a lead compound stabilizer and a phosphorous ester compound.

10 Claims, 1 Drawing Sheet

INSULATED ELECTRIC WIRE FOR HIGH-VOLTAGE DIRECT CURRENT

FIELD OF THE INVENTION

The present invention relates to an insulated electric wire for high-voltage direct current which is used, for example, as high-voltage wiring for television receivers or high-voltage wiring for electronic instruments and devices.

BACKGROUND OF THE INVENTION

Conventional insulated electric wire for high-voltage direct current used in such applications as high-voltage wiring for television receivers and the like include those disclosed in JP-B-51-8465, JP-B-U-56-55859, and JP-B-60-38805. (The terms "JP-B" and "JP-B-U" as used herein mean an "examined Japanese patent publication" and an "examined Japanese utility model publication", respectively.)

JP-B-51-8465 discloses an insulated electric wire which comprises a conductor, a polyethylene insulation layer formed thereon, and a sheath layer formed on the outer periphery of the insulation layer. The sheath layer comprises a resin composition containing an ethylene-vinylacetate-vinylchloride terpolymer as the major component. The electric wire is excellent in flame retardation and high-temperature electrical characteristics.

JP-B-U-56-55859 discloses a high-voltage wiring for television receivers, which comprises a conductor having thereon a covering of a three-layer structure. The covering is composed of a polyethylene insulation formed on the conductor, a flame retardant resin layer composed of electron beam-irradiated polyvinylchloride formed on the outer periphery of the insulation, and a crosslinked polyethylene sheath layer formed on the outer periphery of the flame retardant resin layer.

JP-B-60-38805 discloses an insulated electric wire comprising a conductor, an insulation layer composed of a resin composition containing polyethylene as the major component formed on the conductor, and a flame retardant protective layer formed on the outer periphery of the insulation layer.

It is apparent from the above that all the conventional insulated electric wires for high-voltage direct current have such a structure in that an insulation layer composed of a polyethylene-based resin composition is provided on the conductor, and a flame retardant protective layer is further provided on the outer periphery of the insulation layer.

The conventional insulated electric wires for high-voltage direct current as described above have a problem in that the breakdown voltages of these wires drop significantly during long-term use, although the initial breakdown voltages thereof are as extremely high as about 300 kV.

Use of these conventional insulated electric wires under relatively mild electrical conditions as in conventional applications has not posed any problem. However, the electrical conditions under which insulated electric wires are used become severe. For example, in television receivers, the voltage applied to the conductor of the electric wire becomes higher due to the recent trend of increasing the size of television receiver screens, i.e., the size of cathode ray tubes. Further, because of the trend toward increase in the number of functions for users to be possessed by a single television receiver, the wiring space within the receiver is becoming small, resulting in, for example, a construction in which the high-voltage wire is very close to the grounded circuit.

Because of the above, the decrease in breakdown voltage during the long-term use of the conventional insulated electric wires is in considerable danger of leading to electrical breakdown. Hence, an improvement in this respect has become necessary.

SUMMARY OF THE INVENTION

An object of the present invention is to provide an insulated electric wire for high-voltage direct current which is prevented from suffering decrease in breakdown voltage during long-term use, thereby to eliminate the above-described prior art problem.

Other objects and effects of the present invention will be apparent from the following description.

The present invention provides an insulated electric wire for high-voltage direct current comprising a conductor having thereon an insulation layer comprising a polyethylene resin composition, and a sheath layer provided on the outer periphery of the insulation layer, the sheath layer comprising a flame retardant resin composition comprising a polyvinylchloride grafted polyolefin resin, the flame retardant resin composition containing either (i) a lead compound stabilizer and a hydrotalcite or (ii) a lead compound stabilizer and a phosphorous ester compound. In a preferred embodiment of the present invention, the lead compound stabilizer is a dibasic lead phosphite.

DETAILED DESCRIPTION OF THE INVENTION

Figure 1:
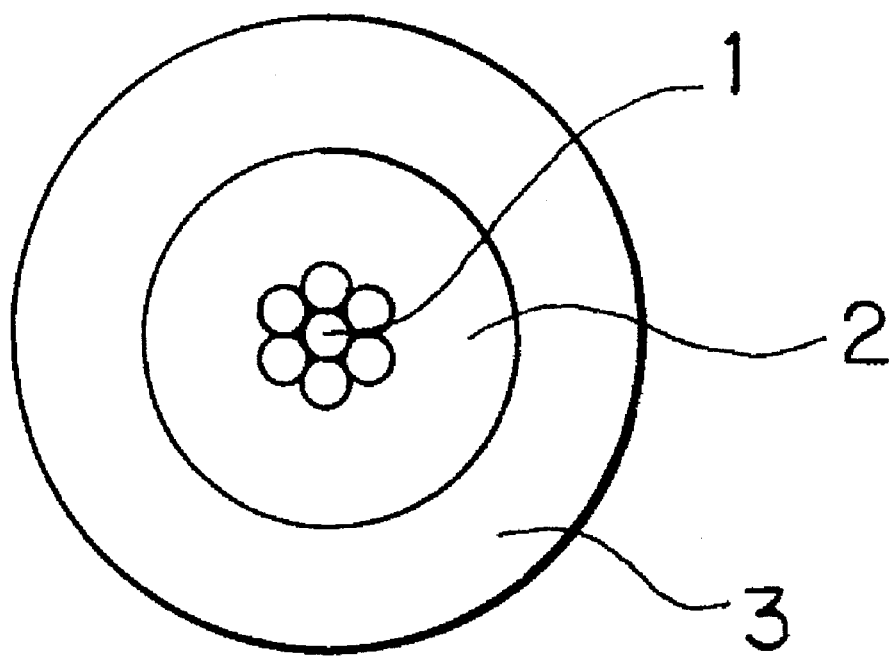
FIG. 1 is a schematic cross-sectional view of one embodiment of the insulated electric wire for high-voltage direct current according to the present invention.

In FIG. 1, numeral 1 denotes a conductor, 2 an insulation layer comprising a polyethylene resin composition containing polyethylene as the major component, and 3 a sheath layer comprising a flame retardant resin composition.

Sheath layer 3 comprises a flame retardant resin composition which comprises a polyvinylchloride grafted polyolefin resin as a main component. The flame retardant resin composition further contains either (i) the combination of a lead compound stabilizer and a hydrotalcite or (ii) the combination of a lead compound stabilizer and a phosphorous ester compound.

The conductor used in the electric wire according to the present invention is not particularly limited in material, constitution, outer diameter and the like. The diameter of the conductor is generally from 0.40 to 1.40 mm, and preferably from 0.51 to 1.02 mm. Examples of the conductor include a solid wire such as that made of a softened copper which may have a tin or nickel plated layer, and a twisted wire such as that made of soft copper which may have a tin or nickel plated layer.

Examples of the polyethylene resin composition containing polyethylene used in the insulation layer include high-density polyethylene, low-density polyethylene, linear low-density polyethylene, and α-olefin copolymers such as ethylene-propylene copolymers and ethylene-1-butene copolymers. These resins may be used alone or as a mixture of two or more thereof. If desired, such ingredients as an antioxidant and a processing stability improver may be incorporated in the insulation layer.

Examples of the polyvinylchloride grafted polyolefin resin constituting the sheath layer include polyvinylchloride grafted ethylene-vinyl acetate copolymers, polyvinylchloride grafted ethylene-methyl methacrylate copolymers, polyvinylchloride grafted chlorinated polyethylene, and polyvinylchloride grafted ethylene-ethyl acrylate copolymers.

In the polyvinyl chloride-grafted polyolefin resin, the amount of grafted polyvinylchloride is not particularly limited as long as desired flame retardation is obtained. In general, the amount of grafted polyvinylchloride is preferably about from 30 to 80% by weight, more preferably from 50 to 70% by weight, based on the total amount of the grafted polyolefin resin. Amounts of grafted polyvinylchloride of smaller than 30% by weight are not preferred since sufficient flame retardation may not be imparted, while grafted amounts exceeding 80% by weight tend to lessen the advantages of the use of the polyolefin resin with respect to the electrical and physical properties of the sheath layer.

The polyolefin resin to which polyvinylchloride is grafted is preferably an ethylene copolymer.

The ethylene content in the ethylene copolymer constituting the backbone of the graft polymer is not particularly limited. In general, the ethylene content is preferably from 30 to 75% by weight, based on the total amount of ethylene copolymer. If the ethylene content is outside this range, there arises possibility in that the inherent properties of the ethylene copolymers may not be exhibited.

Other olefin monomers may be further copolymerized with the ethylene copolymer.

In the polyvinylchloride grafted polyolefin resin, various kinds of additives may be incorporated, such as a processing stabilizer, an organic or inorganic flame retardant, an auxiliary flame-retardant, a colorant, a lubricant, an antioxidant, and a crosslinking agent, e.g., a polyfunctional monomer.

The hydrotalcite used in the present invention is a composite basic carbonate composed of both a divalent metallic ion such as magnesium ion and a trivalent metallic ion such as aluminum. The hydrotalcite is generally used in a powder form having a particle size of from 0.1 to 3 μm. Specific examples thereof include $Mg_{4.5}Al(OH)_{13}CO_3 \cdot 3.5H_2O$, $Mg_{0.67}Al_{0.33}(OH)_2(CO_3)_{0.17} \cdot 0.5H_2O$, and $Mg_{0.67}Al_{0.33}(OH)_2(CO_3)_{0.17} \cdot 0-0.3H_2O$.

Examples of the phosphorous ester compound used in the present invention include alkyl esters of phosphorous acid and alkylaryl esters of phosphorous acid. Many of the phosphorous ester compound used in the present invention are in a liquid state, but if the phosphorous ester compound is solid, it is generally used in a powder form having a particle size of from 0.1 to 3 μm. Specific examples thereof include the following compounds:

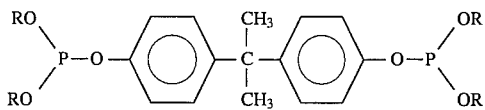

-continued

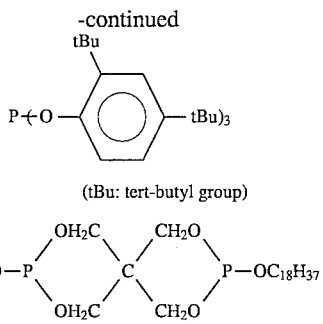

(tBu: tert-butyl group)

The amount of the hydrotalcite or the phosphorous ester compound to be incorporated is preferably from 1 to 20 parts by weight, more preferably from 3 to 10 parts by weight, per 100 parts by weight of the polyvinylchloride grafted polyolefin resin, especially from the standpoint of breakdown voltage after heat aging. Even if the amount of the hydrotalcite or the phosphorous ester compound to be incorporated is increased beyond the upper limit, it is not preferred since the effect of the incorporation cannot be heightened to a satisfactory degree corresponding to the large added amount, resulting in disadvantage in cost.

As the lead compound stabilizer used in the present invention, any conventional lead compound stabilizers can be used, while a dibasic lead phosphate is especially preferred from the standpoint of maintaining the mechanical properties of the sheath layer after heat aging. Better results are obtained when a dibasic lead phosphite is used in combination with the hydrotalcite or the phosphorous ester compound. The use of a dibasic lead phosphite as the lead compound stabilizer thus enables the high-voltage electric wire for direct current to have better long-term reliability.

The amount of the lead compound stabilizer to be incorporated is generally from 1 to 10 parts by weight, preferably from 3 to 10 parts by weight, per 100 parts by weight of the polyvinylchloride grafted polyolefin resin.

For producing the electric wire according to the present invention, the insulation layer and the sheath layer, which have been described above, are formed on a conductor by a conventional technique such as, for example, extrusion coating.

The resulting insulation layer and the sheath layer may be crosslinked by irradiating it with ionizing radiation such as electron beams. An chemical crosslinking agent such as an organic peroxide may be incorporated into the insulation layer and the sheath layer before the layers are provided, so as to crosslink the polymers.

The thickness of the insulation layer is generally from 0.30 to 1.40 mm, and preferably from 0.40 to 1.20 mm. The thickness of the sheath layer is generally from 0.20 to 1.50 mm, and preferably from 0.30 to 1.20 mm. However, the thickness of these layer are not particularly limited.

The high-voltage electric wire for direct current of the present invention can be used for applications such as high-voltage wiring for television receivers, high-voltage wires having a shield layer, high-voltage wiring in various electronic instruments and devices, and the like.

The present invention will be explained in more detail with reference to the following examples, which should not be construed to be limiting the scope of the invention. In the following examples and comparative examples, the parts, percents and the like are by weight unless otherwise indicated.

EXAMPLES 1 TO 12 AND COMPARATIVE EXAMPLES 1 TO 7

A twisted conductor wire (outer diameter: 0.78 mm) was used as a conductor, which consists of seven tin-plated softed copper wires (thickness of tin plating: about 0.5 μm; outer diameter: 0.26 mm). A composition obtained by mixing 100 parts by weight of high-density polyethylene (density: 0.954; melt flow rate: 0.8; ASTM D1238) with 0.3 part by weight of pentaerythrityl tetrakis(3-(3,5-di-t-butyl-4-hydroxyphenyl)propionate) was extruded by a melt extrusion method on the conductor to result in an outer diameter of 2.98 mm, thereby forming an insulation layer.

Resin compositions for a sheath layer were prepared by the following manner: A mixture of 100 parts by weight of a polyvinylchloride grafted ethylene-vinylacetate copolymer (PVC-grafted EVA) (EVA content: 55% by weight; polymerization degree of polyvinyl chloride: 1,400; produced by Sumitomo Chemical Industries, Ltd., Japan), 0.5 part by weight of stearic acid, 25 parts by weight of "Dechloran Plus 25" (perchloropentacyclodecane, produced by Hooker Chem.), 15 parts by weight of antimony trioxide, 25 parts by weight of clay, and 0.5 part by weight of 4,4'-thiobis(6-t-butyl-3-methylphenol), along with lead compound stabilizers, hydrotalcite and/or phosphorous ester compounds as shown in Tables 1 to 7 below was kneaded in an open roll mixer heated at 140° C., and was then formed into pellets.

Each of the thus-obtained resin compositions for the sheath layer was melt-extruded on the insulation layer formed above to result in an outer diameter of 5.20 mm. The resulting coating (insulation layer and sheath layer) was irradiated with electron beams having an accelerating voltage of 2 MV to a dose of 10 Mrad, thereby obtaining an insulated electric wire for high-voltage direct current.

Each sample were measured for an initial breakdown voltage in water at room temperature, an initial tensile strength of the sheath layer (according to the UL Standards), an initial elongation of the sheath layer (according to the UL Standards), and a volume resistivity of the sheath layer. Further, each sample was heat-aged in a constant temperature oven at 136° C. for 7 days, and then measured for a breakdown voltage value in water at room temperature, a retention of tensile strength of the sheath layer, a retention of elongation for the sheath layer, and a volume resistivity of the sheath layer.

The retention of tensile strength and elongation was defined by the following formula:

$$\text{Retention (\%)} = \frac{\text{Value after aging}}{\text{Initial value}} \times 100$$

The breakdown voltage measurement in water was conducted by the following manner: Each electric wire sample was set in a water tank in such a manner that the length of the water-immersed part of the sample was about 10 m. A positive electric potential was then applied to the conductor of the sample, with the water being kept grounded, and the potential was increased at a rate of 10 kV/sec to measure the breakdown voltage. The number of examined samples for each example or comparative example was 5. In the case where breakdown did not occur until the potential reached 300 kV, the potential application was continued for another one minute. If this still did not cause breakdown, the breakdown voltage of the sample was regarded as more than 300 kV.

The results obtained in Examples and Comparative Examples are summarized in Tables 1 to 7 below. In Tables 1 to 7, the amounts of the ingredients, i.e., PVC-grafted EVA, lead compound stabilizers, hydrotalcite, and phosphorous ester compounds are represented in terms of parts by weight.

TABLE 1

|  | Example 1 | Example 2 | Example 3 |
|---|---|---|---|
| Ingredients |  |  |  |
| PVC-grafted EVA | 100 | 100 | 100 |
| Tribasic lead sulfate | 10 | 10 | 10 |
| Hydrotalcite | 3 | 10 | — |
| Phosphorous ester compound (1) | — | — | 5 |
| Properties of Wire |  |  |  |
| Initial breakdown voltage (kV) | >300 | >300 | >300 |
| Break down voltage in water after aging (kV) | >300 | >300 | >300 |
| Properties of Sheath Layer |  |  |  |
| Initial volume resistivity ($10^{12}$ Ωcm) | 4.58 | 2.66 | 1.98 |
| Volume resistivity after aging ($10^{12}$ Ωcm) | 3.62 | 4.04 | 3.07 |
| Initial tensile strength (kg/mm$^2$) | 1.25 | 1.32 | 1.27 |
| Initial elongation (%) | 263 | 256 | 288 |
| Retention of tensile strength after aging (%) | 96 | 107 | 82 |
| Retention of elongation after aging (%) | 68 | 69 | 68 |

TABLE 2

|  | Example 4 | Comparative Example 1 | Comparative Example 2 |
|---|---|---|---|
| Ingredients |  |  |  |
| PVC-grafted EVA | 100 | 100 | 100 |
| Tribasic lead sulfate | 10 | 10 | 20 |
| Phosphorous ester compound (2) | 5 | — | — |
| Properties of Wire |  |  |  |
| Initial breakdown voltage (kV) | >300 | >300 | >300 |
| Break down voltage in water after aging (kV) | >300 | 187 | 166 |
| Properties of Sheath Layer |  |  |  |
| Initial volume resistivity ($10^{12}$ Ωcm) | 2.39 | 5.12 | 3.31 |
| Volume resistivity after aging ($10^{12}$ Ωcm) | 3.58 | 3.75 | 4.14 |
| Initial tensile strength (kg/mm$^2$) | 1.17 | 1.28 | 1.19 |
| Initial elongation (%) | 241 | 254 | 240 |
| Retention of tensile strength after aging (%) | 86 | 91 | 105 |
| Retention of elongation after aging (%) | 66 | 68 | 67 |

TABLE 3

|  | Example 5 | Example 6 | Example 7 |
|---|---|---|---|
| Ingredients |  |  |  |
| PVC-grafted EVA | 100 | 100 | 100 |
| Dibasic lead phosphite | 10 | 10 | 10 |
| Hydrotalcite | 3 | 10 | — |
| Phosphorous ester | — | — | 2 |

TABLE 3-continued

|  | Example 5 | Example 6 | Example 7 |
|---|---|---|---|
| compound (1) | | | |
| Properties of Wire | | | |
| Initial breakdown voltage (kV) | >300 | >300 | >300 |
| Break down voltage in water after aging (kV) | >300 | >300 | >300 |
| Properties of Sheath Layer | | | |
| Initial volume resistivity ($10^{12}$ Ωcm) | 7.06 | 5.54 | 4.97 |
| Volume resistivity after aging ($10^{12}$ Ωcm) | 4.89 | 5.01 | 6.28 |
| Initial tensile strength (kg/mm$^2$) | 1.29 | 1.22 | 1.16 |
| Initial elongation (%) | 234 | 251 | 267 |
| Retention of tensile strength after aging (%) | 115 | 103 | 91 |
| Retention of elongation after aging (%) | 96 | 94 | 90 |

TABLE 4

|  | Example 8 | Comparative Example 3 |
|---|---|---|
| Ingredients | | |
| PVC-grafted EVA | 100 | 100 |
| Dibasic lead phosphite | 10 | 10 |
| Phosphorous ester compound (1) | 5 | — |
| Properties of Wire | | |
| Initial breakdown voltage (kV) | >300 | >300 |
| Break down voltage in water after aging (kV) | >300 | 176 |
| Properties of Sheath Layer | | |
| Initial volume resistivity ($10^{12}$ Ωcm) | 3.56 | 6.28 |
| Volume resistivity after aging ($10^{12}$ Ωcm) | 3.66 | 7.21 |
| Initial tensile strength (kg/mm$^2$) | 1.20 | 1.28 |
| Initial elongation (%) | 253 | 262 |
| Retention of tensile strength after aging (%) | 97 | 102 |
| Retention of elongation after aging (%) | 89 | 69 |

TABLE 5

|  | Example 9 | Example 10 | Comparative Example 4 |
|---|---|---|---|
| Ingredients | | | |
| PVC-grafted EVA | 100 | 100 | 100 |
| Tribasic lead phthalate | 10 | 10 | 10 |
| Hydrotalcite | 5 | — | — |
| Phosphorous ester compound (2) | — | 5 | — |
| Properties of Wire | | | |
| Initial breakdown voltage (kV) | >300 | >300 | >300 |
| Break down voltage in water after aging (kV) | >300 | >300 | 186 |
| Properties of Sheath Layer | | | |
| Initial volume resistivity ($10^{12}$ Ωcm) | 5.42 | 3.54 | 4.47 |
| Volume resistivity after aging ($10^{12}$ Ωcm) | 3.18 | 4.76 | 5.72 |
| Initial tensile strength (kg/mm$^2$) | 1.27 | 1.25 | 1.26 |
| Initial elongation (%) | 264 | 248 | 246 |
| Retention of tensile strength after aging (%) | 95 | 83 | 91 |
| Retention of elongation after aging (%) | 67 | 69 | 68 |

TABLE 6

|  | Example 11 | Example 12 | Comparative Example 5 |
|---|---|---|---|
| Ingredients | | | |
| PVC-grafted EVA | 100 | 100 | 100 |
| Tribasic lead maleate | 10 | 10 | 10 |
| Hydrotalcite | 5 | — | — |
| Phosphorous ester compound (1) | — | 5 | — |
| Properties of Wire | | | |
| Initial breakdown voltage (kV) | >300 | >300 | >300 |
| Break down voltage in water after aging (kV) | >300 | >300 | 173 |
| Properties of Sheath Layer | | | |
| Initial volume resistivity ($10^{12}$ Ωcm) | 2.05 | 3.33 | 3.10 |
| Volume resistivity after aging ($10^{12}$ Ωcm) | 2.68 | 2.47 | 4.18 |
| Initial tensile strength (kg/mm$^2$) | 1.26 | 1.17 | 1.30 |
| Initial elongation (%) | 265 | 239 | 236 |
| Retention of tensile strength after aging (%) | 85 | 83 | 91 |
| Retention of elongation after aging (%) | 67 | 71 | 69 |

TABLE 7

|  | Comparative Example 6 | Comparative Example 7 |
|---|---|---|
| Ingredients | | |
| PVC-grafted EVA | 100 | 100 |
| Hydrotalcite | 5 | — |
| Phosphorous ester compound (1) | — | 5 |
| Properties of Wire | | |
| Initial breakdown voltage (kV) | — | 116 |
| Break down voltage in water after aging (kV) | — | — |
| Properties of Sheath Layer | | |
| Initial volume resistivity ($10^{12}$ Ωcm) | — | 9.43 |
| Volume resistivity after aging ($10^{12}$ Ωcm) | — | — |
| Initial tensile strength (kg/mm$^2$) | — | 0.94 |
| Initial elongation (%) | — | 108 |
| Retention of tensile strength after aging (%) | — | — |

TABLE 7-continued

|  | Comparative Example 6 | Comparative Example 7 |
|---|---|---|
| Retention of elongation after aging (%) | — | — |

Note:
The composition of Comparative Example 6 was scorched during kneading.

Hydrotalcite:

$Mg_{4.5}Al_2(OH)_{13}CO_3 \cdot 3.5H_2O$ 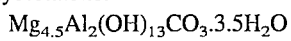

(average particle diameter: 0.4 μm)

Phosphorous ester compound (1):
specific gravity: 0.98
viscosity: 1,000 cps
manufactured by Adeka Argus Chemical Co., Ltd.

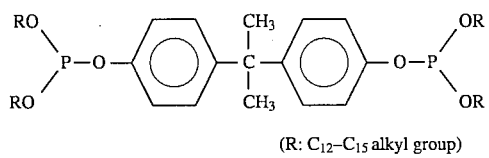

(R: $C_{12}$–$C_{15}$ alkyl group)

Phosphorous ester compound (2):
melting point: 183° C.
manufactured by Adeka Argus Chemical Co., Ltd.

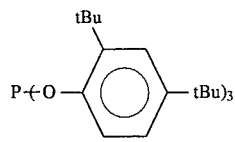

In Examples 1 to 4, tribasic lead sulfate was employed as a lead compound stabilizer in the resin compositions for sheath layer. In combination with this lead compound stabilizer, hydrotalcite was used in amounts of 3 parts by weight and 10 parts by weight in Examples 1 and 2, respectively. Both the initial breakdown voltage and that after heat aging of the electric wires of Examples 1 and 2 were more than 300 kV, showing no decrease in breakdown voltage through the heat aging.

In Examples 3 and 4, tribasic lead sulfate was used in combination with a phosphorous ester. Both the initial breakdown voltage and that after heat aging were more than 300 kV, showing no decrease in breakdown voltage through the heat aging.

In Comparative Examples 1 and 2, tribasic lead sulfate was used alone. Although the initial breakdown voltages of both electric wires were more than 300 kV, the breakdown voltages after heat aging were decreased independently of the amount of tribasic lead sulfate added.

In Examples 5 to 8, dibasic lead phosphite was employed as a lead compound stabilizer in the resin compositions for sheath layer. In Examples 5 and 6, dibasic lead phosphite was used in combination with hydrotalcite. Both the initial breakdown voltage and that after heat aging of the electric wires of Examples 5 and 6 were more than 300 kV, showing no decrease in breakdown voltage through the heat aging.

In Examples 7 and 8, the lead compound stabilizer was used in combination with a phosphorous ester. Both the initial breakdown voltage and that after heat aging were more than 300 kV, showing no decrease in breakdown voltage through the heat aging.

Further, in Examples 5 to 8, the retention of tensile strength of the sheath and the retention of elongation of the sheath after heat aging were both as high as around 90%, showing that the retention of the mechanical properties of the sheath was high. This means that the electric wires of Examples 5 to 8 not only show no decrease in breakdown voltage but show higher reliability in long-term use.

In Comparative Example 3, dibasic lead phosphite was used alone. Although the initial breakdown voltage was more than 300 kV, the breakdown voltage after heat aging was low. The retention of elongation after heat aging was also as low as 69%, which was inferior to those in Examples 5 to 8.

In Examples 9 and 10, tribasic lead phthalate was employed as a lead compound stabilizer in the resin compositions for sheath layer.

In Example 9, dibasic lead phthalate was used in combination with hydrotalcite. Both the initial breakdown voltage and that after heat aging were more than 300 kV, showing no decrease in breakdown voltage through the heat aging.

In Example 10, the lead compound stabilizer was used in combination with a phosphorous ester. Both the initial breakdown voltage and that after heat aging were more than 300 kV, showing no decrease in breakdown voltage through the heat aging.

In Comparative Example 4, tribasic lead phthalate was used alone. Although the initial breakdown voltage was more than 300 kV, the breakdown voltage after heat aging was low.

In Examples 11 and 12, tribasic lead maleate was employed as a lead compound stabilizer in the resin compositions for sheath layer.

In Example 11, tribasic lead maleate was used in combination with hydrotalcite. Both the initial breakdown voltage and that after heat aging were more than 300 kV, showing no decrease in breakdown voltage through the heat aging.

In Example 12, the lead compound stabilizer was used in combination with a phosphorous ester. Both the initial breakdown voltage and that after heat aging were more than 300 kV, showing no decrease in breakdown voltage through the heat aging.

In Comparative Example 5, tribasic lead maleate was used alone. Although the initial breakdown voltage was more than 300 kV, the breakdown voltage after heat aging was low.

In Comparative Example 6, hydrotalcite was used alone without using any lead compound stabilizer. This formulation had a problem that the composition was scorched during kneading.

In Comparative Example 7, a phosphorous ester compound was used alone without using any lead compound stabilizer. The initial tensile strength and elongation were both poor and the initial breakdown voltage value was also low.

It is understood from the above results that only the electric wire samples in which the sheath layer is made of a resin composition employing a lead compound stabilizer in combination with either a hydrotalcite or a phosphorous ester compound show no decrease in breakdown voltage value through heat aging.

It is further understood that the electric wires in which the sheath layer is made of a resin composition employing dibasic lead phosphite, as a lead compound stabilizer, in combination with either a hydrotalcite or a phosphorous ester compound are more advantageous in that the retention of mechanical properties of the sheath layer after heat aging is high and, hence, these electric wires have higher reliability in long-term use.

According to the present invention, an insulated electric wire for high-voltage direct current can be obtained which shows no decrease in breakdown voltage through heat aging and undergoes little decrease in the mechanical properties of the sheath layer through heat aging and which hence has excellent long-term reliability. Therefore, the electric wire of the present invention is of much value when utilized as a high-voltage lead wire for various kinds of electronic machines and devices including television receivers.

While the invention has been described in detail and with reference to specific embodiments thereof, it will be apparent to one skilled in the art that various changes and modifications can be made therein without departing from the spirit and scope thereof.

What is claimed is:

1. An insulated electric wire for high-voltage direct current comprising a conductor having thereon:
   (A) an insulation layer comprising a polyethylene resin composition, and
   (B) a sheath layer provided on the outer periphery of said insulation layer, wherein said sheath layer comprises a flame retardant resin composition comprising
      (i) a-polyvinylchloride grafted polyolefin resin,
      (ii) a lead compound stabilizer, and
      (iii) a hydrotalcite or a phosphorous ester compound.

2. An insulated electric wire for high-voltage direct current as claimed in claim 1, wherein said lead compound stabilizer is a dibasic lead phosphite.

3. An insulated electric wire for high-voltage direct current as claimed in claim 1, wherein the amount of said lead compound stabilizer is from 1 to 10 parts by weight per 100 parts by weight of said polyvinylchloride grafted polyolefin resin.

4. An insulated electric wire for high-voltage direct current as claimed in claim 1, wherein said hydrotalciteis selected from the group consisting of $Mg_{4.5}Al(OH)_{13}CO_3 \cdot 3.5H_2O$, $Mg_{0.67}Al_{0.33}(OH)_2(CO_3)_{0.17} \cdot 0.5H_2O$, and $Mg_{0.67}Al_{0.33}(OH)_2(CO_3)_{0.17} \cdot 0-0.3H_2O$.

5. An insulated electric wire for high-voltage direct current as claimed in claim 1, wherein said phosphorous ester compound is selected from the group consisting of alkyl esters of phosphorous acid and alkylaryl esters of phosphorous acid.

6. An insulated electric wire for high-voltage direct current as claimed in claim 1, wherein the amount of said hydrotalcite or said phosphorous ester compound is from 1 to 20 parts by weight per 100 parts by weight of said polyvinylchloride grafted polyolefin resin.

7. An insulated electric wire for high-voltage direct current as claimed in claim 1, wherein the amount of the polyvinylchloride is from 30 to 80% by weight based on the total amount of said grafted polyolefin resin.

8. An insulated electric wire for high-voltage direct current as claimed in claim 1, wherein said polyolefin resin to which said polyvinylchloride is grafted is an ethylene copolymer.

9. The insulated electric wire for high-voltage direct current as claimed in claim 1, wherein component (iii) in the flame retardant resin composition is the hydrotalcite.

10. The insulated electric wire for high-voltage direct current as claimed in claim 1, wherein component (iii) in the flame retardant resin composition is the phosphorous ester compound.

* * * * *